Patented Feb. 3, 1953

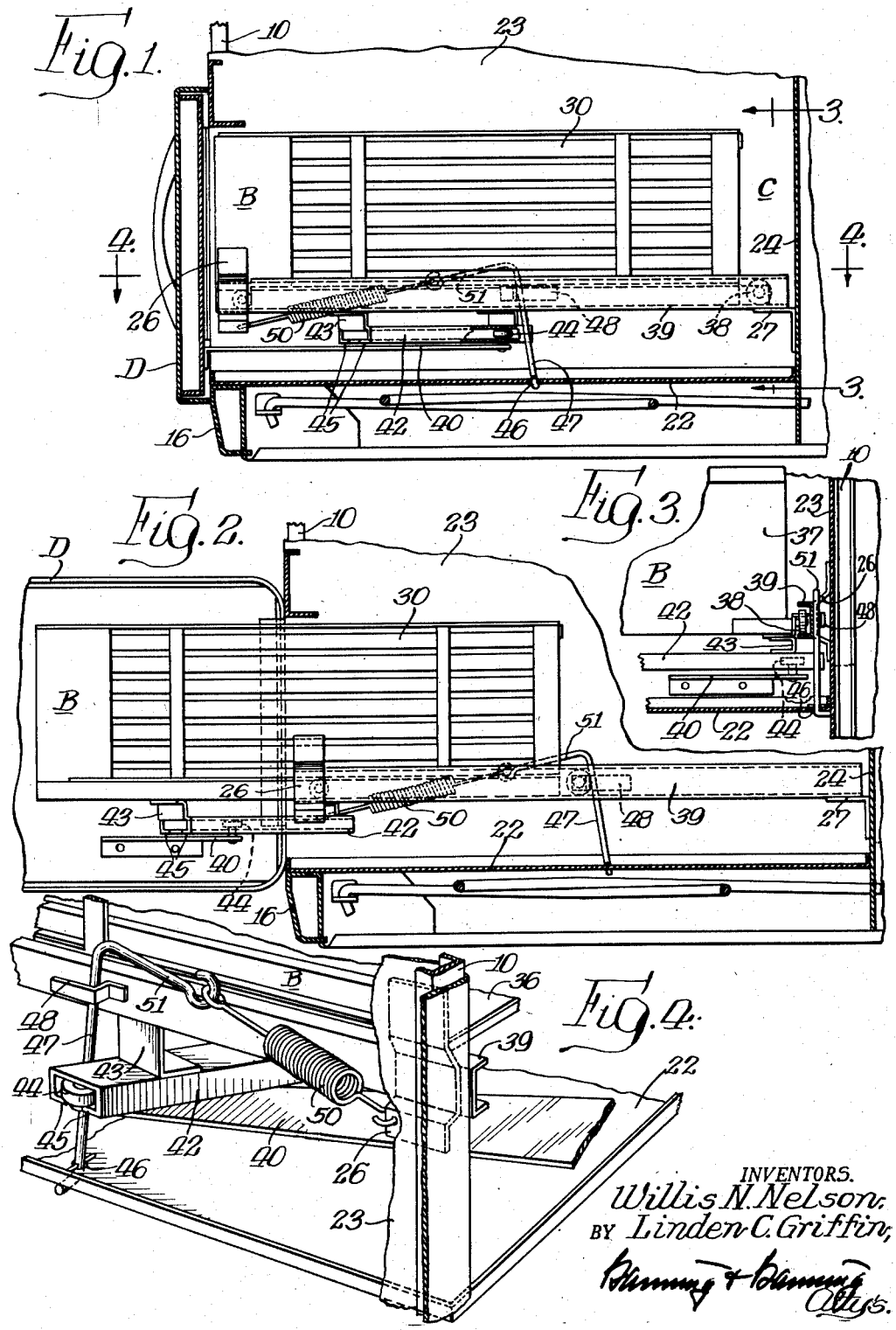

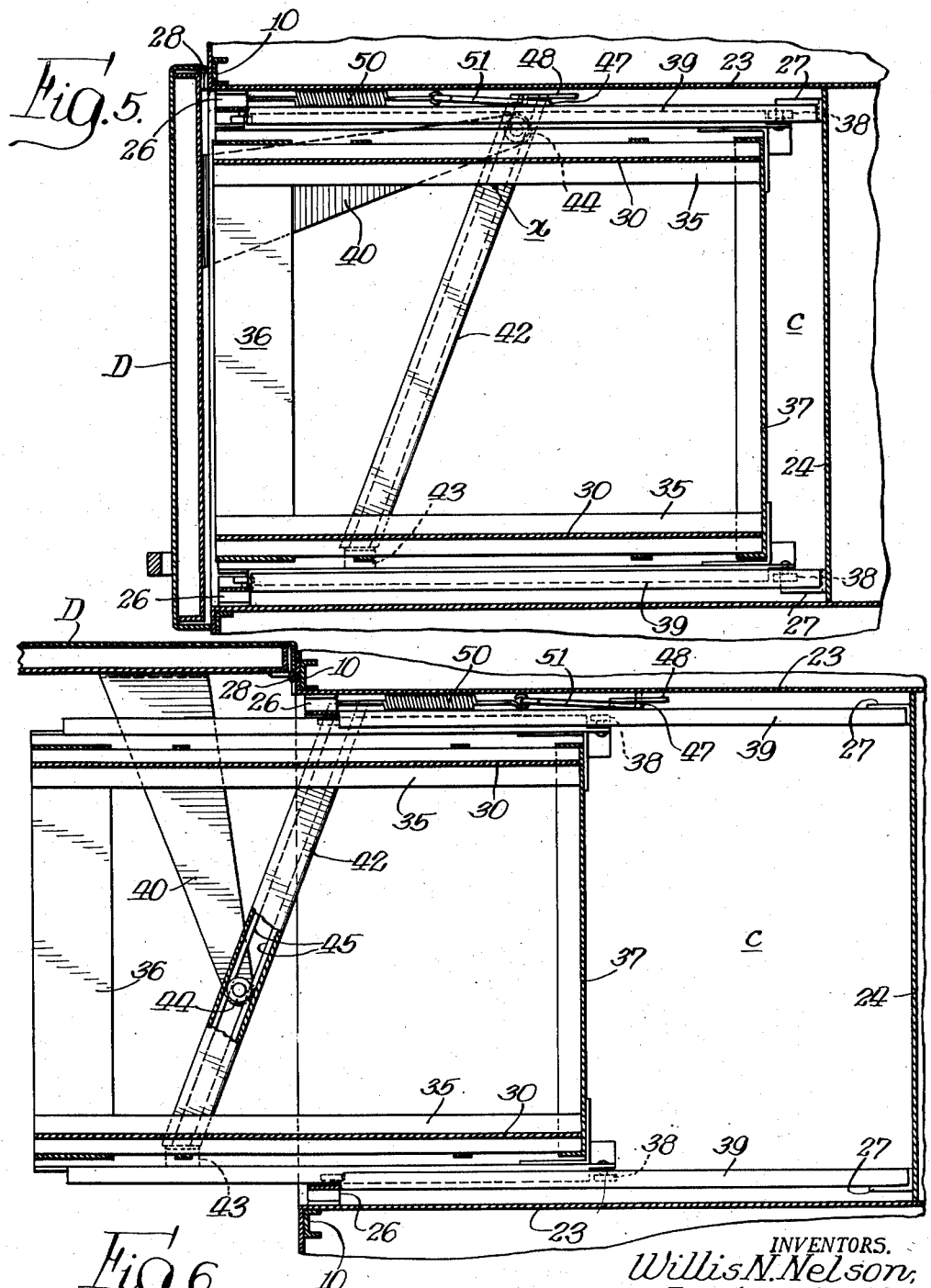

2,627,264

UNITED STATES PATENT OFFICE 2,627,264

DOOR AND DRAWER ASSEMBLY FOR COOKING RANGES

Willis N. Nelson and Linden C. Griffin, Wisconsin Rapids, Wis., assignors to Prentiss Wabers Products Company, Wisconsin Rapids, Wis., a corporation of Wisconsin Application November 3, 1950, Serial No. 193,942

8 Claims. (Cl. 126—41)

1

This invention relates to a cooking range, and particularly to a door and drawer assembly therefor wherein the drawer mounts a food cooking unit generally designated as a broiler.

In kitchen ranges, especially for use in the home, one of the very desirable features is a broiler. Generally the broiler is located below the baking oven so as to utilize the same heating element for cooking in both compartments. The broiling compartment is equipped with its own door which is normally closed during the cooking operation. It is desirable that the support for food to be broiled in the broiler compartment be shiftable into and out of the compartment to facilitate the placement or removal of food, and to permit inspection thereof during the broiling operation.

The main objects of this invention are concerned with the operative connection between the door, which is hingedly mounted at the front of the broiler compartment, and the drawer which is slidably mounted within the compartment for movement forwardly and rearwardly therein. As secondary objects, we aim to provide such a connection which is simple, inexpensive, and dependable in its operation; means for cushioning the drawer at the conclusion of its closing movement, such means also serving to bias the door to its closed position; and means by which the forward movement of the drawer is accelerated through the latter parts of its movement range, and its rearward movement back into the compartment is decelerated in the latter part of its movement range.

These, and other objects of our invention as will hereinafter appear from the detailed description thereof to follow, will be readily apparent by reference to the accompanying drawings wherein is illustrated a suggestive embodiment of our invention in the manner following:

Figure 1 is a fragmentary vertical sectional view through a cooking range, showing our improved door-drawer assembly in the fully closed position;

Fig. 2 is a similar view showing the door-drawer assembly in the fully open position;

Fig. 3 is a fragmentary vertical sectional view, taken on line 3—3 of Fig. 1;

Fig. 4 is a fragmentary perspective view, looking toward the drawer-cushioning spring assembly;

Fig. 5 is a horizontal sectional view, taken on line 4—4 of Fig. 1; and

Fig. 6 is a similar view showing the door-drawer assembly in the fully open position.

2

The cooking range construction, so far as is herein illustrated, comprises a frame 10 defining inter alia a broiler compartment c which is equipped with a door D. A broiler B in the form of a drawer is slidably supported in the compartment, and shifting of the drawer within the compartment, forwardly and rearwardly thereof, is responsive to swinging movements of the door D by the special motion-transmitting means shortly to be described.

The range frame 10 which may be of conventional construction is mounted on a base 16. Other compartments defined by the frame may be provided for cooking and/or storage, but any illustration thereof is unnecessary to an understanding of this invention. Within the frame, and further defining the broiler compartment c are a bottom lining 22, side linings 23, and a back lining 24. Brackets 26 affixed to the frame 10 adjacent the open front of the compartment, one at each side thereof, and angle brackets 27 affixed to the back lining 23, one adjacent each side lining 23, are provided for a purpose shortly to be described. Any suitable means may be provided to serve as stops for limiting outward movement of the drawer. The door D which is of usual construction is hinged at 28 upon one side to swing about a vertical axis that is slightly to the outside of the proximate side lining 23 (see Fig. 5). As a result, the door, when fully open (see Fig. 6), will clear the opening into the broiler compartment c by slightly more than the full width thereof.

As herein shown, the broiler drawer B comprises opposite sides 30 with confronting horizontal corrugations that provide a plurality of ledges in pairs for support between them of a pan or tray (not shown) at a selected elevation. At the base of the drawer are flanges 35 extending both inwardly and outwardly along opposite sides, at the front a cross brace 36, and at the rear a back wall 37. Rollers 38 are mounted at the base of the drawer, at opposite sides thereof, to ride within opposed channeled guides 39 that are extended along the two side linings 23, each being affixed to and carried by one of the brackets 26 in conjunction with one of the brackets 27. By some such means as this the drawer is mounted for sliding movement inwardly and outwardly of the open front of the broiler compartment.

The construction described up to this point is one that may be more or less conventional. The features of improvement which characterize our present invention are concerned with the motion-transmitting connection between the drawer B and door D. In this connection there are three main parts, viz., an elongated bracket arm 40 one end of which is affixed to the door D upon its inner side at a point below the drawer B and close to one of the side linings 23 of the compartment when the door is swung to closed position; a downwardly facing channeled trackway 42, which is fixedly suspended by upturned tongues 43 which are affixed to the base of the drawer thereabove, at a point just above the bracket arm 40 and extended obliquely across the drawer with one of its ends opposite the free end of the bracket arm when the door is in fully closed position, the opposite trackway end being positioned forwardly thereof a considerable distance; and a roller 44 mounted on the bracket arm 40 adjacent its free end and in sliding engagement with the trackway and confined therewithin by inturned flanges 45, but with freedom for movement longitudinally thereof. As shown, the trackway is straight from end to end, and its longitudinal axis defines an acute angle with a line extending between the axes of the roller 44 and the door hinge 28 when the door is in its fully closed position.

When the door D is opened the roller 44 is required to travel lengthwise of the trackway, and initially it retracts the drawer B a very slight distance until the roller has passed the point $x$ of shortest distance between the trackway 42 and the axis of the hinge 28. From this point on the roller 44 in its continued movement transmits a forward movement to the drawer B, this movement accelerating as the door opening movement proceeds due to the lengthening radial distance between the axes of the roller 44 and the hinge 28. At the conclusion of this opening movement the parts will be positioned as shown in Fig. 6. When the door is shut, the drawer B will be moved inwardly, its movement starting off at a fast rate which steadily decelerates until the roller 44 reaches the point $x$ of shortest distance between the trackway 42 and the axis of the door hinge 28. Here the drawer is in its furthest rearward position from which it advances forwardly again a slight distance as the roller proceeds on through the balance of its movement to the position of Fig. 5.

A spring cushion is also provided, effective when the broiler drawer B is in its nearly closed position. As shown best in Fig. 4, this comprises a bearing in the form of a hole 46 in the bottom lining 22 of the broiler compartment and forming a pivotal mounting for the laterally turned lower end of an upwardly extending arm 47 of wire or the like which is disposed immediately rearwardly of the trackway 42 to engage therewith at a point which is extended beyond the proximate side of the drawer; a clip 48 affixed to the proximate channeled guide 39 of the broiler compartment at a point above the trackway and providing for the arm a combined guide and stop; and a tension spring 50 in connection at one end with a forwardly extending finger 51 at the upper end of the arm 47, the other spring end being formed into a hook for releasable engagement with the bracket 26 that is affixed to the range frame 10 at a point relatively close to the open front of the compartment. The spring-arm assembly lies within the space between one side of the broiler drawer and the proximate side lining of the broiler compartment. When the broiler drawer B is advanced outwardly, the arm 47 advances, in response to tension of the spring 50, through the short distance that is permitted by the clip 48 which serves as a stop therefor (see Fig. 2). The major part of the drawer movement, both in and out, proceeds independently of any biasing on the part of the spring. When retracted into the compartment, in response to closing movement of the door D, there will be no engagement with the spring-tensioned arm 47 until the drawer B has moved in relatively close to the point $x$ where the roller 44 is positioned the shortest distance away from the door hinge axis 28. Here a yielding resistance is encountered, increasing until the roller 44 has passed the point $x$, and then decreasing again, but still maintaining sufficient force to bias the door D (through the drawer B) to its closed position. In the opening movement of the door, a reverse of these operations takes place.

The parts which are comprised in the motion-transmitting interconnection between the swinging door and the sliding drawer are few, simple, inexpensive, and well protected. It will be noted that the channeled trackway is downwardly faced so as to completely enclose the roller which is slidingly confined therewithin. This is advantageous in case any food or drippings should fall on the trackway or bracket arm. When the door is fully opened, the bracket arm is fully exposed so that cleaning of its top surface may be readily performed. The trackway, however, is not so accessible and the roller therewithin is completely inaccessible so long as its operative relationship with the trackway is maintained. For these reasons the protection afforded by a trackway of the kind described is advantageous so that continued satisfactory operation of the roller-trackway assembly may be assured.

The spring-arm assembly which cushions the drawer toward the end of its inward movement and also biases the door in its closed position, is advantageous in several respects. It comprises only parts that may be readily disconnected and disassembled, and vice versa. Furthermore, these parts occupy only a very narrow space so as to be accommodatable between one side of the broiler drawer and the proximate side lining of the broiler compartment. Accessibility is therefore maintained, but without exposure of the spring-arm assembly during normal use of the range. There is also a very substantial mechanical advantage gained from employing a lever of the 2nd class (the arm 47) wherein the effort (the spring 50) is enhanced in effectiveness by reason of the ratios involved. As a result, the extent of spring expansion and contraction is amplified as compared to the range of drawer movement, thus assuring a highly sensitive and soft action, both when cushioning the drawer and door at the conclusion of their inward movements and when exerting an assisting force during the initial stage of their outward movements.

We claim:

1. In a cooking range of the type wherein a drawer is mounted within an open-front broiler compartment to slide inwardly and outwardly thereof and a closure door having a hinged mounting upon a vertical axis is provided for the open front of the compartment, the improvement in a motion-transmitting connection between the door and drawer which comprises a horizontal trackway affixed to the drawer at its base and extending transversely thereacross, a horizontal elongated bracket arm affixed at one end to the inner face of the door and, when the door is closed, having its free end positioned inwardly of the broiler compartment adjacent one side thereof and the proximate end of the drawer trackway, and a roller carried by the bracket arm near its free end and in sliding engagement with the trackway and movable lengthwise thereof to transmit motion thereto and to the drawer in response to opening and closing movements of the door.

2. In a cooking range of the type wherein a drawer is mounted within an open-front broiler compartment to slide inwardly and outwardly thereof and a closure door having a hinged mounting upon a vertical axis is provided for the open front of the compartment, the improvement in a motion-transmitting connection between the door and drawer which comprises a horizontal trackway affixed to the drawer at its base and extending obliquely from one side thereof to the other, a horizontal elongated bracket arm affixed at one end to the inner face of the door and, when the door is closed, having its free end positioned inwardly of the broiler compartment adjacent the proximate end of the drawer trackway and the side of the broiler compartment where the trackway is disposed furthest from the front thereof, and a roller carried by the bracket arm near its free end and in sliding engagement with the trackway and movable lengthwise thereof to transmit an accelerated motion thereto and to the drawer in response to opening movement of the door, the roller at the conclusion of the door opening movement being disposed toward the end of the trackway which is closest to the front of the drawer.

3. In a cooking range of the type wherein a drawer is mounted within an open-front broiler compartment to slide inwardly and outwardly thereof and a closure door having a hinged mounting upon a vertical axis is provided for the open front of the compartment, the improvement in a motion-transmitting connection between the door and drawer which comprises a horizontal trackway affixed to the drawer at its base and extending transversely thereacross, a horizontal elongated bracket arm affixed at one end to the inner face of the door and, when the door is closed, having its free end positioned inwardly of the broiler compartment adjacent one side thereof and the proximate end of the drawer trackway, and a roller carried by the bracket arm near its free end and in sliding engagement with the trackway and movable lengthwise thereof to transmit motion thereto and to the drawer in response to opening and closing movements of the door, the trackway being so disposed relative to the hinge axis of the door mounting that the shortest distance therebetween is at a point spaced from the position of the roller when the door is in fully closed position whereby initial opening movement of the door transmits initially a rearward movement to the drawer and thereafter a forward movement thereto.

4. In a cooking range of the type wherein a drawer is mounted within an open-front broiler compartment to slide inwardly and outwardly thereof and a closure door having a hinged mounting upon a vertical axis is provided for the open front of the compartment, the improvement in a motion-transmitting connection between the door and drawer which comprises a horizontal trackway affixed to the drawer at its base and extending transversely thereacross, a horizontal elongated bracket arm affixed at one end to the inner face of the door and, when the door is closed, having its free end positioned inwardly of the broiler compartment adjacent one side thereof and the proximate end of the drawer trackway, a roller carried by the bracket arm near its free end and in sliding engagement with the trackway and movable lengthwise thereof to transmit motion thereto and to the drawer in response to opening and closing movements of the door, the position of the trackway relative to the hinge axis of the door mounting being such that the shortest distance therebetween is at a point spaced from the roller when the door is in fully closed position whereby, upon initial opening movement of the door, a rearward movement is initially imparted to the drawer and thereafter a forward movement thereto, and spring means associated with the drawer and operable, when the door nears completion of its rearward movement, to yieldingly oppose further inward movement thereof and reactively resist closing movement of the door until after the roller has passed the point of closest distance between the trackway and the hinge axis of the door.

5. In a cooking range of the type wherein a drawer is mounted within an open front broiler compartment to slide inwardly and outwardly thereof and a closure door having a hinged mounting upon a vertical axis is provided for the open front of the compartment, the improvement in a motion-transmitting connection between the door and drawer which comprises a horizontal elongated bracket arm affixed at one end to the inner face of the door and, when the door is closed, having its free end positioned inwardly of the broiler compartment adjacent one side thereof, a roller carried by the bracket arm upon its top face near the free end thereof, and a horizontal trackway affixed to the drawer at its base and extending transversely thereacross at an elevation slightly above the bracket arm and in a position to be slidingly engaged by the roller thereof, the trackway being in the form of a downwardly facing channel extending over and around the roller to afford protection thereto and, when the latter is advanced therewithin in response to swinging movements of the door, acting to impart sliding movements to the drawer.

6. In a cooking range of the type wherein a drawer is mounted within an open-front broiler compartment to slide inwardly and outwardly thereof, a closure door having a hinged mounting upon a vertical axis is provided for the open front of the compartment, and a two-way motion-transmitting means interconnects the door and drawer to produce concurrent operation thereof, the improvement in a spring cushion assembly for the door and drawer which comprises an arm pivoted at one end to the range to swing forwardly toward the drawer for engagement therewith at a point intermediately of the arm ends, a spring connected to the free end of the arm for biasing the arm forwardly toward the drawer to maintain engagement therewith through a limited distance of its movement, and a stop for limiting the forward swinging movement of the arm thereby to disengage said arm from the drawer when the latter continues its movement outwardly through the open front of the compartment, the arrangement being such that the drawer re-engages the arm only when retracted nearly to its innermost position whereby the spring is effective to bias the drawer and door only through the inner end portions of their movements.

7. In a cooking range of the type wherein a drawer is mounted within an open-front broiler compartment to slide inwardly and outwardly thereof, a closure door having a hinged mounting on a vertical axis is provided for the open front of the compartment, and a two-way motion transmitting means interconnects the door and drawer to produce concurrent operation thereof, the improvement in a spring cushion assembly for the drawer and door which comprises protruding means extending beyond one side of the drawer, a vertically disposed arm pivoted at one end to the range to swing forwardly toward the drawer protruding means for engagement therewith at a point intermediately of the arm ends, the arm being disposed closely adjacent the drawer side from which the protruding means is extended, a spring affixed at one end to the range and connected at its other end to the free end of the arm for biasing the arm forwardly toward the drawer protruding means to maintain engagement therewith through a limited distance of the drawer movement, and a combined guide and stop affixed to the range and cooperating with the arm to confine its swinging movements to a vertical plane and to limit the forward swinging movement thereof, thereby to disengage said arm from the drawer protruding means when the drawer continues its movement outwardly through the open front of the compartment, the arrangement being such that the drawer protruding means re-engages the arm only when the drawer is retracted nearly to its innermost position whereby the spring is effective to bias the door and drawer only through the inner end portions of their movements.

8. In a cooking range of the type wherein a drawer is mounted within an open-front of a broiler compartment to slide inwardly and outwardly thereof, a closure door having a hinged mounting upon a vertical axis is provided for the open front of the compartment, and a two-way motion transmitting means interconnects the door and drawer to produce concurrent operation thereof, the improvement in a spring cushion assembly for the drawer and door which comprises protruding means extending beyond one side of the drawer adjacent its base, a vertically disposed arm pivoted at its lower end to the range and extending along the drawer side adjacent the protruding means to swing forwardly for engagement therewith at a point intermediately of the arm ends, a tension spring connected to the upper free end of the arm and extended forwardly therefrom for connection at its opposite end to the range and biasing the arm forwardly toward the drawer protruding means to maintain engagement therewith through a limited distance of the drawer movement, and a stop for limiting the forward swinging movement of the arm thereby to disengage said arm from the drawer when the latter continues its movement outwardly through the open front of the compartment, the arrangement being such that the drawer protruding means engages the arm only when the drawer is retracted nearly to its innermost position whereby the spring is effective to bias the drawer and door only through the inner end portions of their movements.

WILLIS N. NELSON.
LINDEN C. GRIFFIN.

REFERENCES CITED

The following references are of record in the file of this patent:

UNITED STATES PATENTS

| Number | Name | Date |
|---|---|---|
| 2,029,713 | Hobson et al. | Feb. 4, 1936 |
| 2,268,481 | Hardwick | Dec. 30, 1941 |
| 2,299,052 | Dexter | Oct. 13, 1942 |
| 2,473,467 | Burt | June 14, 1949 |
| 2,514,936 | Cook | July 11, 1950 |